Patented Jan. 9, 1940

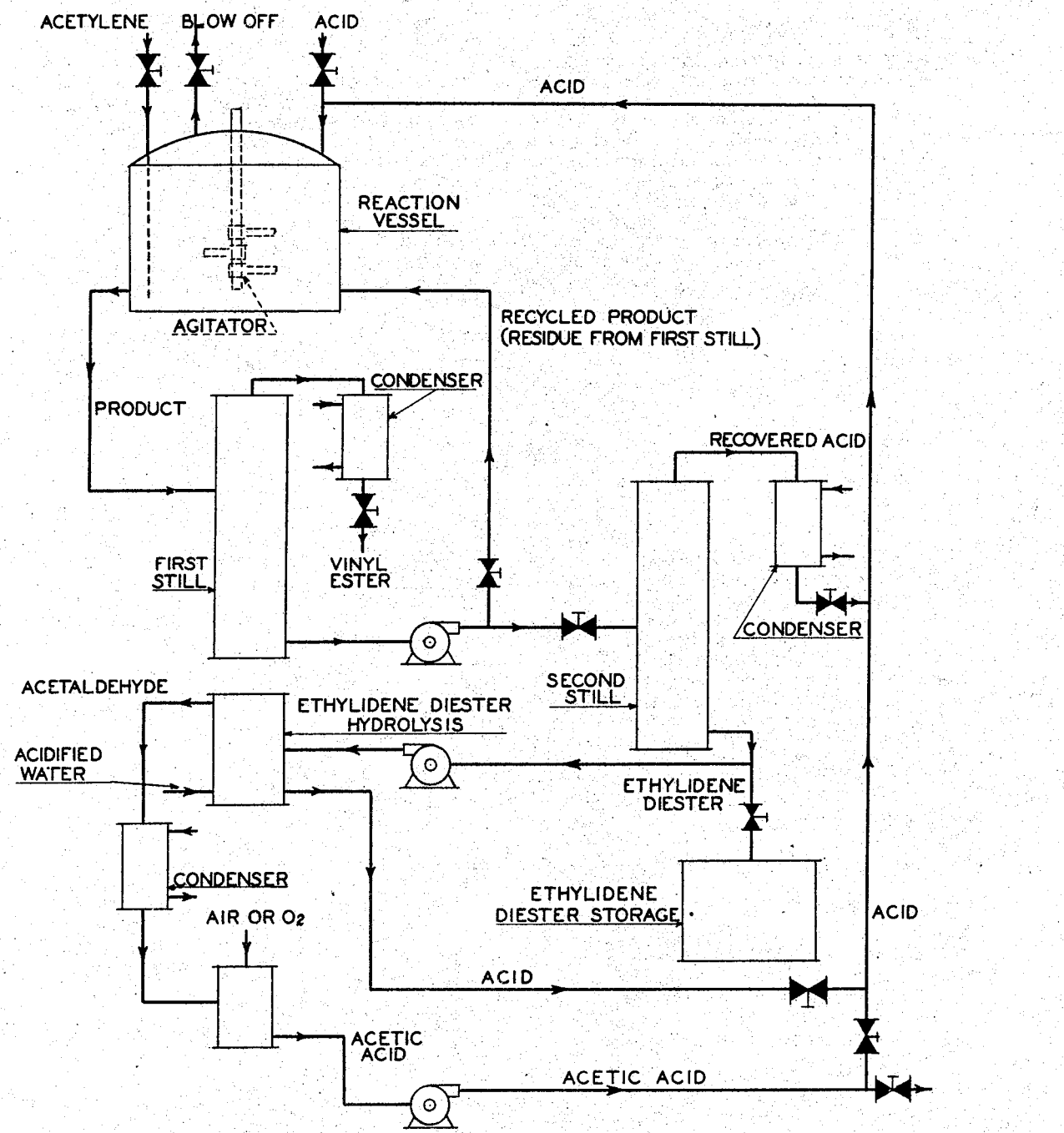

2,186,437

UNITED STATES PATENT OFFICE 2,186,437

VINYL ESTERS

Walter J. Toussaint, Charleston, W. Va., assignor to Carbide and Carbon Chemicals Corporation, a corporation of New York Application November 11, 1936, Serial No. 110,270

18 Claims. (Cl. 260—498)

This invention presents improvements in the process of making vinyl esters through the reaction of acetylene with carboxylic acids in the presence of mercuric catalysts.

The reaction between acetylene and carboxylic acids to form ethylidene diesters and vinyl esters was first disclosed by Klatte in 1913. His teachings included the use of mercury compounds to catalyze the reaction, and the use of catalytically acting substances, such as mineral acids, sulfonic acids and acid salts, in conjunction with these mercuric catalysts. Sulfuric and phosphoric acids were specifically shown for this purpose. Many variations of Klatte's original process have been proposed, but none of these has departed from his teachings in the essential particulars of the reaction, and, to this time, the best available catalysts for promoting the combination of acetylene with carboxylic acids have remained those essentially derived from mercury compounds and sulfuric acids.

The object of my invention is to provide catalytically acting acid substances for use in Klatte's process which are capable of promoting a smooth reaction between acetylene and various carboxylic acids, and to make possible the economical and efficient production of vinyl esters in yields greater than those previously obtainable from this reaction. My invention includes a generally improved process for making vinyl esters, in particular the acetate.

These ends may be attained through the use of catalytically acting acid substances essentially composed of heteropoly acids in conjunction with mercury compounds as catalysts. In the presence of these new catalysts, I have found that quantities of vinyl esters can be produced per unit of mercury used which are greatly in excess of those which can be obtained in the presence of mercury compounds and sulfuric acid.

The bodies designated here as heteropoly acids are best described as complex inorganic substances of high molecular weight in which two or more different acid cations, or oxides of metals or metalloids, are associated with varying, and frequently indeterminate, amounts of combined water and water of hydration. The molecular size of these bodies may be as great as 3000, and they function as polybasic acids, apparently possessing from 5 to 10 or more acid hydrogen atoms. Little is known as to the actual constitution of the heteropoly acids, but they probably include a nuclear cation, such as an oxide of phosphorus, silicon, boron or arsenic, coordinated with a group of other cations which may be oxides of tungsten, molybdenum, vanadium, chromium, sulfur, selenium, tellurium, or one of the first named group other than that of the nuclear element. Nearly all of the heteropoly acids are quite soluble in water.

Heteropoly acids can be formed by reacting salts and acids of the different metals or metalloids to be included in the complex. This reaction may be effected by heating these materials in aqueous solution, after which the mixture can be acidified with a strong acid, and the heteropoly acid formed can be extracted with a water-immiscible solvent. For example, tungstomolybdophosphoric acid was made by dissolving 100 parts by weight of sodium tungstate and 25 parts by weight of sodium molybdate in 700 parts by weight of water. To this solution was added 84.5 parts by weight of 85% phosphoric acid and 119 parts by weight of C. P. hydrochloric acid. The entire mixture was then heated at 100° C. for sixteen hours. At the end of this period, the mixture was further acidified with hydrochloric acid, and stirred with ethyl ether. Three phases formed, and the lower layer was withdrawn and evaporated to obtain the tungstomolybdophosphoric acid. Silicotungstic, borotungstic, phosphotungstic, silicomolybdic, phosphomolybdic and other heteropoly acids suitable for use in this invention have been prepared by similar procedures.

The actual catalyst used for carrying the reaction between acetylene and carboxylic acids to make vinyl esters is preferably made by precipitating mercury by means of acetylene passed into a solution of mercuric acetate in acetic acid (or other mercuric carboxylate in the corresponding acid), and thereafter adding the heteropoly acid. This catalyst is active immediately upon preparation. The method of preparing the catalyst, and the proportions of catalytic materials used for its preparation, will vary somewhat depending on the temperature at which the reaction is to be conducted. For use at low temperatures, such as from about 15° to 350° C., equal weight quantities of mercuric oxide, as such or in the form of the mercuric carboxylate, and the heteropoly acid should be used, while at higher temperatures of, say, about 50° to 105° C., only one-half as much heteropoly acid should be employed.

Other methods for preparing the catalyst may be employed. For example, one part of heteropoly acid, such as silicotungstic acid, may be dissolved in 100 parts of carboxylic acid, and the solution saturated with acetylene. One part of mercuric carboxylate dissolved in the carboxylic acid is then added to the first solution. This catalyst is useful at higher temperatures from about 50° to 95° C., and becomes active after a brief induction period of comparative inactivity. A less desirable form of the catalyst may be made by dissolving mercuric oxide in the carboxylic acid and adding the heteropoly acid to this solution. The mixture is then stirred under an atmosphere of acetylene at 50° to 75° C. for a short time. The catalyst may be used at 70° to 75° C., and it assumes activity after a brief induction period.

The exact nature of these catalysts is not known, but they apparently are not simple inorganic salts of mercury and the heteropoly acid used. Most probably, the catalysts are more complex organo-metallic substances, or mixtures of substances, which exist as gelatinous masses.

The quantity of the catalyst used for the reaction may vary greatly. In general, the mercury compound (calculated as the corresponding mercuric carboxylate) should be equal to at least 0.005%, and preferably from about 0.25% to 1.0%, by weight of the carboxylic acid maintained in the reaction, and the heteropoly acid should be employed in an amount ranging from one-half to about equal that of the mercury compound, according to the temperature at which it is to be used. Larger quantities of catalytic materials may be used, but are unnecessary.

In carrying out the reaction to obtain vinyl esters, the new catalysts may be used according to any of the known methods of reacting acetylene with carboxylic acids. For example, the carboxylic acid containing the catalyst may be saturated with acetylene, followed by distillation of the reaction mixture to isolate the product. Alternatively, the preparation of vinyl esters may be carried out continuously by passing an excess of acetylene through a body of carboxylic acid and the catalyst, and the vinyl ester formed in this method may be recovered as a condensate from the effluent excess acetylene.

I prefer to conduct the reaction continuously using a system in which excess acetylene is not required, and which provides efficient recovery and reuse of all of the constituents of the reaction mixture. The accompanying drawing diagrammatically represents the flow of materials in a system embodying a preferred operation of the process.

In operation, the reaction may be carried out at temperatures of from about 15° to about 105° C. The catalyst is prepared as described, using the appropriate proportions of materials and procedure for the portion of this temperature range in which the reaction is to be conducted. An operating temperature of about 35° C. is generally preferred. Acetylene is then passed into an agitated body of the carboxylic acid containing the catalyst. Absorption of acetylene is quite rapid, and a slight blow-off of gas is maintained in order to prevent excessive accumulation of inert gases in the reaction zone. Mechanical stirring devices may provide the agitation desired, or it can be obtained by introducing the gas stream through diffusers into the body of liquid. A portion of the reaction mixture is withdrawn either continuously or periodically from the reaction zone, and passed to a still for the recovery of the vinyl ester. The reaction is supplied with fresh carboxylic acid to compensate for the liquid withdrawn.

The vinyl ester is obtained as a distillate from the reaction mixture in the first still, and the residue, composed of the carboxylic acid together with some ethylidene diester, may be returned to the reaction, or treated separately in a second still. I prefer to pass at least a portion of the residue to a second still, where the carboxylic acid is obtained as a distillate and returned to the reaction, and the ethylidene diester is separately recovered. The ethylidene diester may be used as such, or it may be hydrolized, for example, by distilling it with water containing a strong acid. The products of hydrolysis are acetaldehyde and the carboxylic acid. Of these, the latter may be returned to the reaction for reuse in the process, and the former can be treated further with oxygen or air to yield acetic acid. In the vinyl ester to be produced in the process is vinyl acetate, the oxidation of acetaldehyde yields still further quantities of acid for use in the original reaction.

It is occasionally necessary to replenish the catalyst in the reaction mixture, and additions of small quantities of either the mercury carboxylate or heteropoly acid will, in some cases, serve this purpose, but the addition of both is usually preferable.

When the catalyst used in this process is to be replaced, it is desirable to recover the constituents of the spent catalyst, and I have provided means for carrying this out efficiently and economically. Recovery of the catalyst constituents includes, first, separation of the catalyst from the reaction mixture, and, second, chemical treatment of the separated catalyst to convert it again to mercuric oxide and the heteropoly acid.

Separation of the catalyst may be accomplished by filtering or by centrifuging the reaction mixture, or, preferably, by distilling the mixture to leave a solid, dry residue of the catalyst material in pulverent form. The separated material may then be distilled, at reduced pressures, to drive off the mercury, which is recovered as a distillate, leaving a residue of oxides of the elements of the heteropoly acid. The mercury can then be converted to mercuric oxide through its nitrate or chloride, and the oxides of the elements of the heteropoly acid may be treated with sodium hydroxide solution to form a solution of sodium salts of those oxides. The latter then can be treated as previously described to form the heteropoly acid. Alkalies other than sodium hydroxide also may be used to form soluble compounds of the elements of the heteropoly acid present.

Recovery of the catalyst materials may be carried out periodically, or in more or less continuous fashion by treating portions of the withdrawn reaction mixture.

A few specific examples will now be given to illustrate the salient features of my invention. In these examples, proportions of materials are expressed gravimetrically. In each of the following examples, the preparation of vinyl acetate from acetic acid and acetylene will be described for comparative purposes, but it will be understood that other vinyl aliphatic esters can be similarly prepared by replacing acetic acid with formic, propionic, butyric or other carboxylic acid. In the case of higher carboxylic acids, the process gives best results if the catalyst is formed from the mercury compound and heteropoly acid in a body of a lower carboxylic acid, such as acetic acid. The preformed catalyst in the lower acid is then added to the higher molecular weight acid, and the addition of acetylene carried out as described. This procedure has proved to be satisfactory in making vinyl esters of 2-ethylbutyric acid and the like.

Example 1

In each experiment in the operation of the process, the mercuric oxide was dissolved in acetic acid and mixed with an acetic acid solution of the heteropoly acid at about 50° C. This treatment resulted in the formation of a precipitate. The mixture was then stirred under acetylene for the period indicated at 48° to 52° C. The amounts of acetylene absorbed during this period and for the last hour of operation are shown. Generally, the initial absorption was rather low during the induction period required for such catalysts, as pointed out above.

The product of the reaction was distilled at a pressure of about 65 mm. of mercury, and the distillate and residue were fractionated separately to recover the products formed.

In one experiment, sulfuric acid was used in place of the heteropoly acid to afford a comparison of the results obtained:

| Run No. | 1 | 2 | 3 | 4 | 5 | 6 |
|---|---|---|---|---|---|---|
| Mercuric oxide....parts.. | 2 | 4 | 4 | 4 | 4 | 4 |
| Heteropoly acid......do.... | 2 | 4 | 4.3 | 4 | 4 | |
| Sulfuric acid..........do.... | | | | | | 5.1 |
| Acetic acid..........do.... | 404 | 420 | 400 | 400 | 436 | 399 |
| Temperature......°C.. | 48–52 | 48–53 | 48–52 | 48–52 | 48–52 | 48–52 |
| Duration..........hours.. | 6 | 6 | 5 | 6 | 11 | 5 |
| Acetylene absorbed—parts: | | | | | | |
| Last hour of operation.... | 12.3 | 12 | 1.7 | 0.5 | 0 | 0 |
| Total.................... | 47 | 47 | 38 | 18 | (*) | 16 |
| Products—parts: | | | | | | |
| Vinyl acetate .......... | 111 | 127 | 96 | 58 | 90 | 50 |
| Ethylidene diacetate.... | 37 | 13 | 27 | Trace | 18 | |
| Acetaldehyde.......... | 2.4 | .4 | 2.5 | 3.2 | 1.4 | 7 |
| Recovered acetic acid... | 289 | 299 | 296 | 350 | 339 | 352 |
| Residue................ | 7 | 10 | 9 | 8.4 | | 10 |

*Not determined.

The only variation in procedure in carrying out these experiments was in the case of Run No. 6, in which the sulfuric acid was added in three portions of 1.7 parts each at the start and at the end of the third and fourth hours.

The heteropoly acids used were:

Run No. 1—Silicotungstic acid.
Run No. 2—Phosphotungstic acid.
Run No. 3—Silicomolybdic acid.
Run No. 4—Phosphomolybdic acid.
Run No. 5—Tungstomolybdophosphoric acid.

Example 2

The data below show the operation of my new process using another method of preparing the catalyst. In each case the mercury compound was dissolved in acetic acid. This solution was treated with acetylene for 20 minutes and a precipitate was formed. The heteropoly acid was then added, and the treatment with acetylene was continued. Rapid absorption of the gas took place immediately.

The reaction mixture was fractionated, as in Example 1, to recover the products.

| Run No. | 7 | 8 | 9 | 10 | 11 | 12 |
|---|---|---|---|---|---|---|
| Mercuric oxide......parts.. | 4 | | 4 | 4 | 4 | 4 |
| Mercuric acetate....do... | | 2 | | | | |
| Heteropoly acid......do... | 4 | 2.8 | 4.3 | 4 | 4 | |
| Sulfuric acid..........do... | | | | | | 5.1 |
| Acetic acid..........do... | 402 | 200 | 392 | 401 | 402 | 396 |
| Acetic anhydride....do... | | 11 | | | | |
| Temperature......°C.. | 34–36 | 35 | 34–36 | 34–36 | 34–36 | 34–36 |
| Duration..........hours.. | 5 | 3.5 | 5 | 5 | 5 | 5 |
| Acetylene absorbed—parts: | | | | | | |
| Last hour of operation... | 6.5 | | 3.0 | 0 | 0.2 | 0 |
| Total.................... | 87 | 20 | 55 | 25 | 25 | 21 |
| Products—parts: | | | | | | |
| Vinyl acetate......... | 187 | 60 | 115 | 57 | 71 | 48 |
| Ethylidene diacetate... | 74 | 16 | 82 | 31 | 51 | 39 |
| Acetaldehyde......... | Trace | Trace | 9 | | 2.8 | 2.1 |
| Recovered acetic acid.. | 183 | 147 | 219 | 323 | 294 | 329 |
| Residue............... | 21 | 5 | 9.2 | 9.5 | 13 | 8.6 |

The acids used in these experiments were the following:

Run No. 7—Silicotungstic acid.
Run No. 8—Borotungstic acid.
Run No. 9—Silicomolybdic acid.
Run No. 10—Phosphomolybdic acid.
Run No. 11—Tungstomolybdophosphoric acid.
Run No. 12—Sulfuric acid.

In Run No. 8, the borotungstic acid was added in two portions of 1.3 and 1.5 parts at the start and at the beginning of the second hour of operation, respectively. Also, a small quantity of acetic anhydride was used in this experiment.

In Run No. 12, the sulfuric acid was added in three portions of 1.7 parts each at the start, and at the beginning of the third and fourth hours of operation. During the last hour of operation in Run No. 12, the mixture was heated to 50° C.

Example 3

In the operation of the new process in the following experiments, a semi-continuous system of operation was followed. The catalysts were prepared as indicated in Example 2, and the vinyl acetate was distilled out of the reaction mixture, after each one hour period of acetylene absorption, at the reaction temperature and at a pressure of 35 mm. of mercury. Additional acetic acid was added to the reaction mixture to replace that removed in the distillation.

| Run No. | 13 | 14 |
|---|---|---|
| Mercuric oxide.............................parts.. | 4 | 4 |
| Phosphotungstic acid......................do.... | 4 | |
| Sulfuric acid...............................do.... | | 7.4 |
| Acetic acid at start.........................do.... | 415 | 399 |
| Acetic acid added..........................do.... | 244 | 145 |
| Temperature.............................°C.. | 34–36 | 34–36 |
| Duration..............................hours.. | 5 | 5 |
| Acetylene absorbed—parts: | | |
| Last hour of operation................... | 9.3 | 4.5 |
| Total.................................... | 62 | 39 |
| Products—parts: | | |
| Vinyl acetate.......................... | 130 | 44 |
| Ethylidene diacetate................... | 33 | 9 |
| Acetaldehyde.......................... | 9 | 7 |
| Recovered acetic acid................. | 519 | 480 |
| Residue............................... | 11.8 | 9.4 |

In carrying out the process in Run No. 14, the sulfuric acid was added in two portions of 3.7 parts each at the start and after the third hour of operation.

The various heteropoly acids used in the above experiments are, for the most part, available commercially, although equivalent material can be made following the procedure previously described for the preparation of tungstomolybdophosphoric acid. For example, the phosphomolybdic acid used is available commercially and is stated to have the formula

20MoO₃.2H₃PO₄+Aq

Equivalent material to this product was made by stirring together 36 parts of molybdic acid, 3 parts of sodium phosphate and 100 parts of water at 100° C. for 17 hours, followed by the addition of hydrochloric acid and extraction with ether. The silicomolybdic acid used was prepared by stirring together 12 parts of sodium silicate monohydrate and 36 parts of molybdic acid in 200 parts of water for 42 hours at 100° C. This mixture was acidified and extracted with ether to obtain the heteropoly acid. The phosphotungstic acid used was a commercial product which was stated to have the formula

P₂O₅.24WO₃.XH₂O

The borotungstic acid used likewise was a commercial product identified only by its specific gravity of 2.6 to 3.0. The silicotungstic acid employed was a commercial product, and equivalent material was prepared by reacting together 112 parts of sodium tungstate dihydrate and 10 parts of sodium silicate monohydrate in 200 parts of water at 100° C. To this was gradually added 119 parts of C. P. hydrochloric acid. The mixture was then cooled and stirred with diethyl ether. Three phases formed, the lowest of which was removed and evaporated to recover the silicotungstic acid.

Many modifications in the process described are possible without departing from the essential features of my invention, and such modifications are included within the invention as defined by the appended claims.

I claim:

1. Process which comprises reacting acetylene with a carboxylic acid in the presence of a mercury compound of a heteropoly acid.

2. Process which comprises reacting acetylene with a carboxylic acid in the presence of a mercury compound of a heteropoly acid, and recovering a vinyl ester from the reaction product.

3. Process which comprises reacting acetylene with an aliphatic carboxylic acid in the presence of catalytically acting quantities of a mercury compound of a heteropoly acid.

4. Process which comprises reacting acetylene with a lower fatty acid in the presence of a mercury compound of a heteropoly acid.

5. Process for making vinyl esters which comprises reacting acetylene with carboxylic acids in the presence of a mercury compound of a heteropoly acid at a temperature between about 15° and about 105° C.

6. Process for making vinyl esters which comprises reacting acetylene with one of the group consisting of formic, acetic, propionic, butyric, and 2-ethylbutyric acids in the presence of a mercury compound of a heteropoly acid.

7. Process for making vinyl esters which comprises reacting acetylene with carboxylic acids in the presence of a mercury compound of a heteropoly acid of the group consisting of silicotungstic, phosphotungstic, silicomolybdic, phosphomolybdic, tungstomolybdophosphoric, and borotungstic acids.

8. Process for making vinyl acetate which comprises reacting acetylene with acetic acid in the presence of a mercury compound of a heteropoly acid.

9. Process for making vinyl acetate which comprises reacting acetylene with acetic acid in the presence of a mercury compound of silicotungstic acid.

10. Process for making vinyl propionate which comprises reacting acetylene with propionic acid in the presence of a mercury compound of a heteropoly acid.

11. Process for making vinyl butyrate which comprises reacting acetylene with butyric acid in the presence of a mercury compound of a heteropoly acid.

12. In a continuous process for producing vinyl esters, the steps which comprise reacting acetylene with a carboxylic acid in the presence of a mercury compound of a heteropoly acid, distilling the vinyl ester from the reaction product, thereafter distilling the carboxylic acid from the residue of said reaction product to form a residue containing ethylidene diester, hydrolizing said ethylidene diester to liberate carboxylic acid, and returning to the reaction both the carboxylic acid recovered and that liberated by hydrolysis.

13. In a continuous process for making vinyl acetate, the steps which comprise reacting acetylene with acetic acid in the presence of a mercury compound of silicotungstic acid at a temperature of from about 15° to about 105° C., distilling vinyl acetate from the reaction product, thereafter distilling acetic acid from the residue of said reaction product to form a residue containing ethylidene diacetate, hydrolizing said ethylidene diacetate to liberate acetic acid, and returning to the reaction both the acetic acid recovered and that liberated by hydrolysis.

14. Process for making catalytically acting substances for promoting the reaction of acetylene with carboxylic acids which comprises treating a solution of a mercury compound in a carboxylic acid with acetylene and a heteropoly acid.

15. Process for making catalytically acting substances for promoting the reaction of acetylene with carboxylic acids which comprises treating a solution of a mercury compound in the carboxylic acid with acetylene to form a precipitate, and thereafter adding a heteropoly acid to the mixture.

16. Process for making catalytically acting substances for promoting the reaction of acetylene with carboxylic acids which comprises dissolving a heteropoly acid in the carboxylic acid, treating the solution with acetylene, and thereafter adding a mercury compound to said solution.

17. Process for recovering catalytic materials from reaction mixtures containing mercury compounds of heteropoly acids which comprises distilling said mixtures to obtain mercury as a distillate, and thereafter treating the residue with alkali to form soluble compounds of the elements of said heteropoly acid.

18. Process for making catalytically acting substances for promoting the reaction of acetylene with carboxylic acids, which comprises separating a mercury compound of a heteropoly acid from mixtures containing it by heating said mixtures to separate mercury as a distillate, treating the residue with alkali to form soluble compounds of the elements of said heteropoly acid, treating said soluble compounds with strong mineral acid to regenerate the heteropoly acid and recovering the regenerated heteropoly acid by the aid of a water-immiscible solvent, forming a solution of a mercury compound in a carboxylic acid, and thereafter treating said solution with acetylene and the regenerated heteropoly acid.

WALTER J. TOUSSAINT.

CERTIFICATE OF CORRECTION.

Patent No. 2,186,437.   January 9, 1940.

WALTER J. TOUSSAINT.

It is hereby certified that error appears in the printed specification of the above numbered patent requiring correction as follows: Page 1, second column, line 49, for "350° C." read 35° C.; page 2, second column, line 27, for the word "In" read If; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.